US010117123B2

(12) United States Patent
Mittal (10) Patent No.: US 10,117,123 B2
(45) Date of Patent: Oct. 30, 2018

(54) METHODS AND SYSTEMS FOR NETWORK SERVICES RELATED TO GEOGRAPHIC LOCATION

(71) Applicant: SANDVINE INCORPORATED ULC, Waterloo (CA)

(72) Inventor: Ambuj Mittal, Bangalore (IN)

(73) Assignee: SANDVINE INCORPORATED ULC, Waterloo, Ontario (CA)

( * ) Notice: Subject to any disclaimer, the term of this patent is extended or adjusted under 35 U.S.C. 154(b) by 0 days.

(21) Appl. No.: 13/761,250

(22) Filed: Feb. 7, 2013

(65) Prior Publication Data

US 2013/0210464 A1    Aug. 15, 2013

(30) Foreign Application Priority Data

Feb. 13, 2012   (IN) .............................. 402/DEL/2012

(51) Int. Cl.
| | | |
|---|---|---|
| *H04W 28/02* | (2009.01) | |
| *H04W 4/021* | (2018.01) | |
| *H04L 29/08* | (2006.01) | |

(52) U.S. Cl.
CPC ......... *H04W 28/0226* (2013.01); *H04L 67/18* (2013.01); *H04W 4/022* (2013.01)

(58) Field of Classification Search
CPC ....... H04W 4/02; H04W 4/021; H04W 4/022; H04W 4/028; H04W 4/023; H04W 4/025; H04L 29/08; H04L 43/026; G01S 5/0009

(Continued)

(56) References Cited

U.S. PATENT DOCUMENTS

2007/0287474 A1    12/2007  Jenkins et al.
2008/0261615 A1*  10/2008  Kalhan ................. G01S 5/0009
                                                                    455/456.1

(Continued)

OTHER PUBLICATIONS

Greenwald et al, "An Economically Viable Solution to Geofencing for Mass-Market Applications", Bell Labs Technical Journal, Sep. 1, 2011, pp. 21-38, vol. 16, No. 2, Wiley Periodicals, California.

(Continued)

*Primary Examiner* — Julio Perez
(74) *Attorney, Agent, or Firm* — Gowling WLG (Canada) LLP; Neil W. Henderson (57) ABSTRACT

A method for applying network services related to geographic location including receiving regions within a map and receiving geo-service definitions for the regions. The method includes determining a subscriber's region and determining information related to the subscriber's traffic flow. The method then applies geo-service definitions based on the subscriber's region and the information related to the traffic flow. A system for applying network services related to geographic location having a location detection module for detecting a subscriber's location and a region detection module for determining the subscriber's region within a map based on the subscriber's location. The system further including a geo-service definition and enablement module for defining geo-service definitions and actions; and a subscriber detection and traffic management module adapted to receive the subscriber's region and apply geo-service definitions to the subscriber traffic flow based in part on the region of the subscriber.

10 Claims, 7 Drawing Sheets

(58) Field of Classification Search
USPC .............. 455/456.3, 456.1, 456.2; 370/235
See application file for complete search history.

(56) References Cited

U.S. PATENT DOCUMENTS

| | | |
|---|---|---|
| 2009/0170528 A1 | 7/2009 | Bull et al. |
| 2012/0023226 A1* | 1/2012 | Petersen et al. ............ 709/224 |
| 2012/0026947 A1 | 2/2012 | Miller et al. |
| 2012/0051219 A1* | 3/2012 | Hart .................... H04L 43/026 370/235 |
| 2012/0220314 A1* | 8/2012 | Altman et al. ............ 455/456.3 |
| 2012/0233311 A1* | 9/2012 | Parker et al. ................ 709/224 |
| 2012/0253551 A1* | 10/2012 | Halimi .................. G07C 5/008 701/1 |
| 2012/0309350 A1* | 12/2012 | Kim ............................ 455/411 |

OTHER PUBLICATIONS

European Patent Office, Extended European Search Report on European Appln. No. 13154656.6, dated Jun. 24, 2013.
3GPP TS 25.305, "Universal Mobile Telecommunications System (UMTS); Stage 2 Functional specification of User Equipment (UE) Position in Universal Terrestrial Radio Access Network (UTRAN)", Sep. 2012, ver. 11.0.0, Rel. 11, http://www.3gpp.org.
European Patent Office, Examination Report on EP Appln. No. 13154656.6, dated Jul. 8, 2014.

* cited by examiner

METHODS AND SYSTEMS FOR NETWORK SERVICES RELATED TO GEOGRAPHIC LOCATION

FIELD

The present disclosure relates generally to management of network traffic. More particularly, the present disclosure relates to methods and systems for network services related to geographic location.

BACKGROUND

Network operators and, in particular, mobile or wireless network operators, desire to know usage patterns of the users of their networks. Knowing usage patterns can help the network operator design more effective and efficient networks and billing systems, especially in relation to the subscriber's location when using the network. Conventional systems tend to rely on network nodes such as Home Location Register (HLR), which can be defined as a database within a wireless network which stores all the subscriber data and is updated as the subscriber moves in the network. The database may include the subscriber location, which is the initial location where a connectivity such as a call was established and may include real time updates of the subscriber's location during the ongoing call, which can be taxing on the network. Further, the location information may be limited to the granularity of cell.

Other conventional systems have used geographic boundaries that may be limited by what can be described through a single or group of configured network topology levels, for example, boundaries defined by a group of cells or routing areas or service areas. As these topologies are defined as part of the network planning process, the topologies tend to be static in nature and as a result, boundaries defined by them are static as well. Consequently, it is not possible to chalk out boundaries as "random regions on a map" or boundaries that include partial network topologies (half cells). Further, boundaries cannot be redefined without re-planning the network.

Still other conventional systems require location detection to be done by the user equipment and report the location along with information on application usage to a central server. This type of system requires the network operator to build customized applications that must be installed or downloaded to the user equipment. This may be difficult to accomplish given the diverse nature of user devices and open platforms, especially in retail markets. This type of system typically also requires the network operator to setup a central server that is collating data from millions of subscribers. This increases network signaling and leads to revenue leakage since data exchange between the user device and the central server will likely be zero billed.

It is, therefore, desirable to provide new and improved methods and systems for network services related to geographic location.

SUMMARY

In a first aspect, the present disclosure provides a method for applying network services related to geographic location including: receiving regions within a map; receiving geo-service definitions for the regions; determining a subscriber's region; determining information related to the subscriber's traffic flow; and applying geo-service definitions based on the subscriber's region and the information related to the traffic flow.

In some cases, the method further includes defining geo-service definitions per traffic flow.

In some cases, the method includes generating reports of the applied geo-service definitions per subscriber to a network operator. The regions within the map can be updated based on the generated reports. The geo-service definitions can also be modified based on the generated reports.

In some cases the map is defined by cellular topology attributes.

In some cases, the method may also include determining if a subscriber has changed region; and re-applying geo-service definitions based on the subscriber's changed region and the information related to the traffic flow.

In some cases, the method may also include determining if a subscriber's traffic flow has changed; and re-applying geo-service definitions based on the subscriber's region and the information related to the changed traffic flow.

In some cases, a plurality of geo-service definitions may be applied if a subscriber's region is determined to be within a plurality of regions within a map.

In a further aspect, there is provided a system for applying network services related to geographic location having: a location detection module for detecting a subscriber's location; a region detection module for determining the subscriber's region within a map based on the subscriber's location; a geo-service definition and enablement module for defining geo-service definitions and actions; and a subscriber detection and traffic management module adapted to receive the subscriber's region and identify information relating to the subscriber's traffic flow and apply geo-service definitions to the subscriber traffic flow based on the region of the subscriber and the information relating to the subscriber's traffic flow.

In some cases, the system includes a user interface configured to allow for updating regions and geo-service definitions for the system In some cases, the region detection module further defines a map for a network operator.

In some cases, the subscriber detection and traffic management module identifies information relating to the subscriber's traffic flow via a traffic identification engine configured to inspect packets in a traffic flow on the network to determine a protocol being carried by the flow. The subscriber detection and traffic management module applies geo-service definitions based on information relating to a subscriber's traffic flow via a geo-service mapping component configured to correlate the protocol of the traffic flow with the geo-service definitions.

In some cases, the subscriber detection and traffic management module identifies information relating to the subscriber's traffic flow via a traffic identification engine configured to inspect packets in a traffic flow on the network to determine an application being carried by the flow. The subscriber detection and traffic identification module applies geo-service definitions based on information relating to a subscriber's traffic flow via a geo-service mapping component configured to correlate the application of the traffic flow with the geo-service definitions.

In some cases, the system may also have a reporting component configured to generate reports of the applied geo-service definitions per subscriber.

In some cases, the geo-service definitions define geo-service actions to be applied to the traffic flow.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides methods and systems for network services implementing geographic location (geo-location) services. As a particular example, the description herein focuses on wireless packet networks that enable web applications (Level 7 (L7) applications) and data usage aware services. The methods and systems described herein are intended to aid a network operator in at least the following areas:
  Network provisioning/planning based on application and usage patterns, for example:
    Implementing geo-fences for low value traffic (P2P, OTA downloads) in high traffic city centers or business districts;
    Geo-fencing for social networking applications and pornographic sites in school areas, which could be driven by parental control and child security;
    Prioritized real time applications (such as VoIP) in business districts during business hours; and/or
    Restricted application access in high security areas such as military establishments and airports.
  Security and monitoring applications, for example:
    Triggering alarms to the parents when a child's phone is active in a location outside of a school locality during school hours;
    Online geo-tracking of field staff and goods for courier and shipping companies; and/or
    Geo-tracking of drivers and vehicles for cab and logistic companies.
  Geographically aware billing, for example:
    Differentiated billing plans based on using certain applications in different parts of the network, for example, discounted in home-zones and low volume areas, premium billing in high traffic zones; and/or
    Marketing and/or Promotions, for example zero billing in a mall for accessing a captive portal to get discount coupons or other information.

The systems and methods described herein are intended to allow for usage aware geo-location services, which include:
  operator configurable and controllable systems and methods;
  detecting of subscriber location based on information exchanged over network links, which can be deployed without interfacing directly with either network nodes or subscriber equipment;
  addressing any geographic region and not being limited to a specific and/or defined cellular topology level;
  targeting a single subscriber or any group of subscribers as defined by the operator; and
  enabling service enforcement at an application level, which may include applying different fences and billing categories for different applications when used in various defined geographic areas.

The system and methods detailed herein are intended to provide techniques for detecting subscriber presence in operator defined network regions, identifying applications and protocols being used by subscribers and enabling operator qeo-service definitions, namely, defined services that are based on geographic region based network usage.

Figure 1:
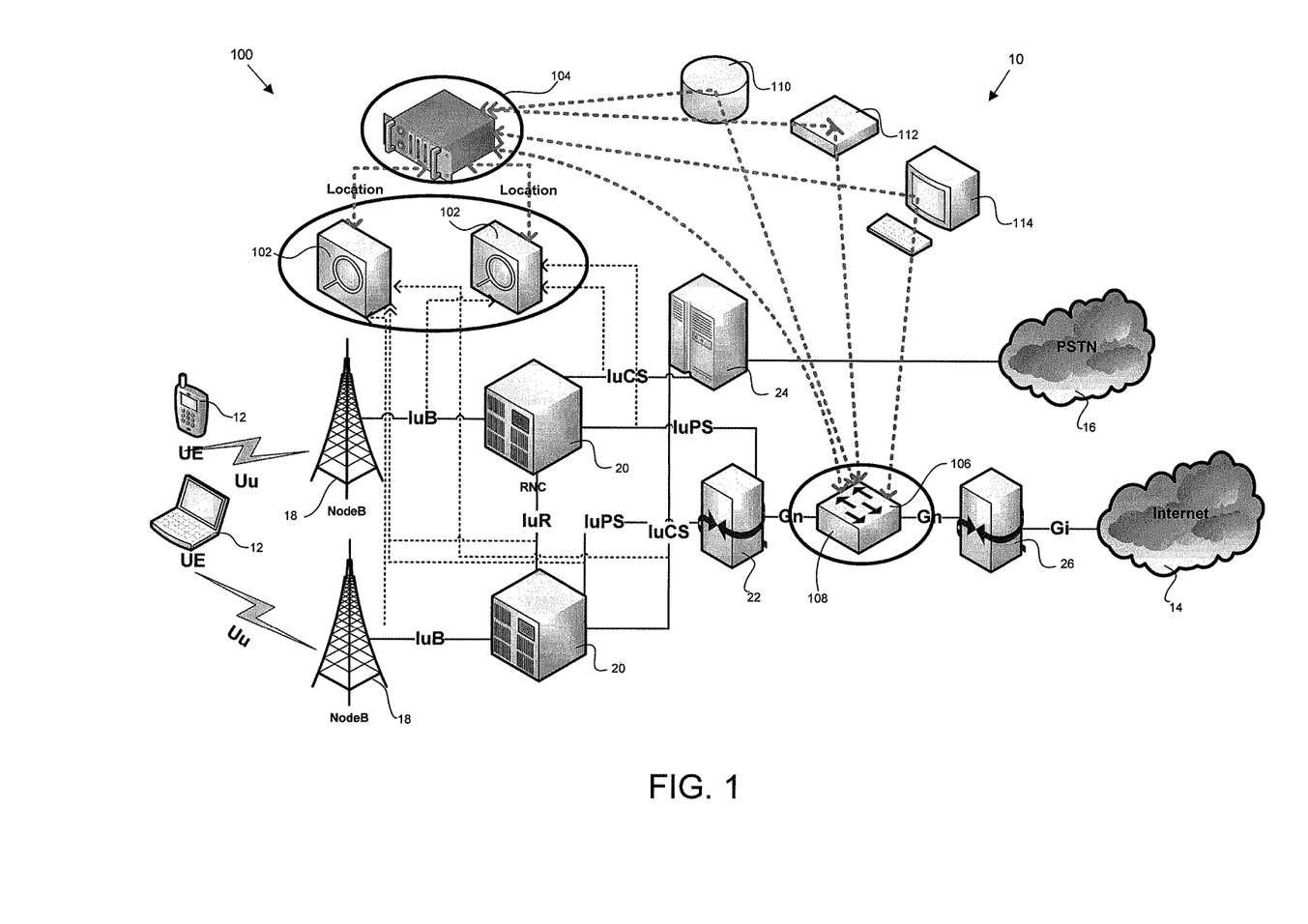
FIG. 1 illustrates an example network with a system for geographic location (geo-location) related services.

FIG. 1 illustrates an embodiment of a system for geo-location related services 100 as deployed in a network 10. The system 100 includes a location detection module 102, a region detection module 104, a subscriber detection and traffic management module 106 and a geo-service definition and enablement module 108. In this figure the subscriber data and traffic management module 106 and the geo-service definition and enablement module 108 are shown as a single component, but it will be understood that these components may be separate and operatively connected with each other and with the network 10. The network 10 consists of user equipment 12 accessing a network such as the Internet 14 or a public switched telephone network 16. It will be understood other networks may be accessed by the user equipment 12. The user equipment 12 accesses the network via a NodeB apparatus 18 connected through an interface to a Radio Network Controller (RNC) 20. The RNC 20 may be linked to a Servicing General Packet Radio Services (GPRS) Support Node (SGSN) 22 or a Mobile Switching Center (MSC) 24, depending on the network with which the user equipment 12 is trying to connect. The SGSN 22 may allow the traffic to flow through components of the system prior to being received by the Gateway GPRS Support Node (GGSN) 26 before connecting to the Internet 14.

The system 100 may be located such that at least some of the modules continuously review traffic flow on the network 10. Other modules may be located between the SGSN 22 and MSC 24 as only traffic to and from the Internet 14 may be reviewed. The system 100 or some of the system modules may further be operatively connected to external databases 110, storing for example subscriber provisioning information, and centralized reporting modules 112 and may further include at least one user interface 114.

The location detection module 102 is adapted to detect location of a subscriber in the radio network. In one example, the location detection module 102 monitors and decodes signaling protocol packets as the packets flow on the interfaces (Iu), such as, NodeB Application Part (NBAP) on the interface between the Node B 18 and the RNC 20 (IuB) and the Radio Access Network Application Part (RANAP) on the interface between the RNC 20 and the SGSN 22 (IuPS). The location detection module 102 correlates data from decoded packets to identify a current CellId of the subscriber. The location detection module 102 may extract the Round Trip Time (RTT) and Transmitted Code power from NBAP messages. The location detection module 102 deciphers the payload of Iu packets to extract the Radio Resource Control (RRC) information related to the Observed Time Difference Of Arrival (OTDOA) and other radio measurements from the subscriber's user equipment 12. The location detection module 102 may use this data to derive location relative to the base station antenna of the current cell. The location detection module 102 is also configured to monitor data on the interfaces to detect mobility of the subscriber from one cell to another in the radio network. The location information for the subscriber (Cell Id and distance relative to the base station antenna) is communicated to the region detection module 104.

The location detection module 102 may detect location in other ways, for example, through GPS coordinates or other location information that may be transmitted in the traffic flow. Various methods to detect location are known, and the accuracy of the determined location of the subscriber may vary depending on the method used to detect subscriber location.

Figure 2:
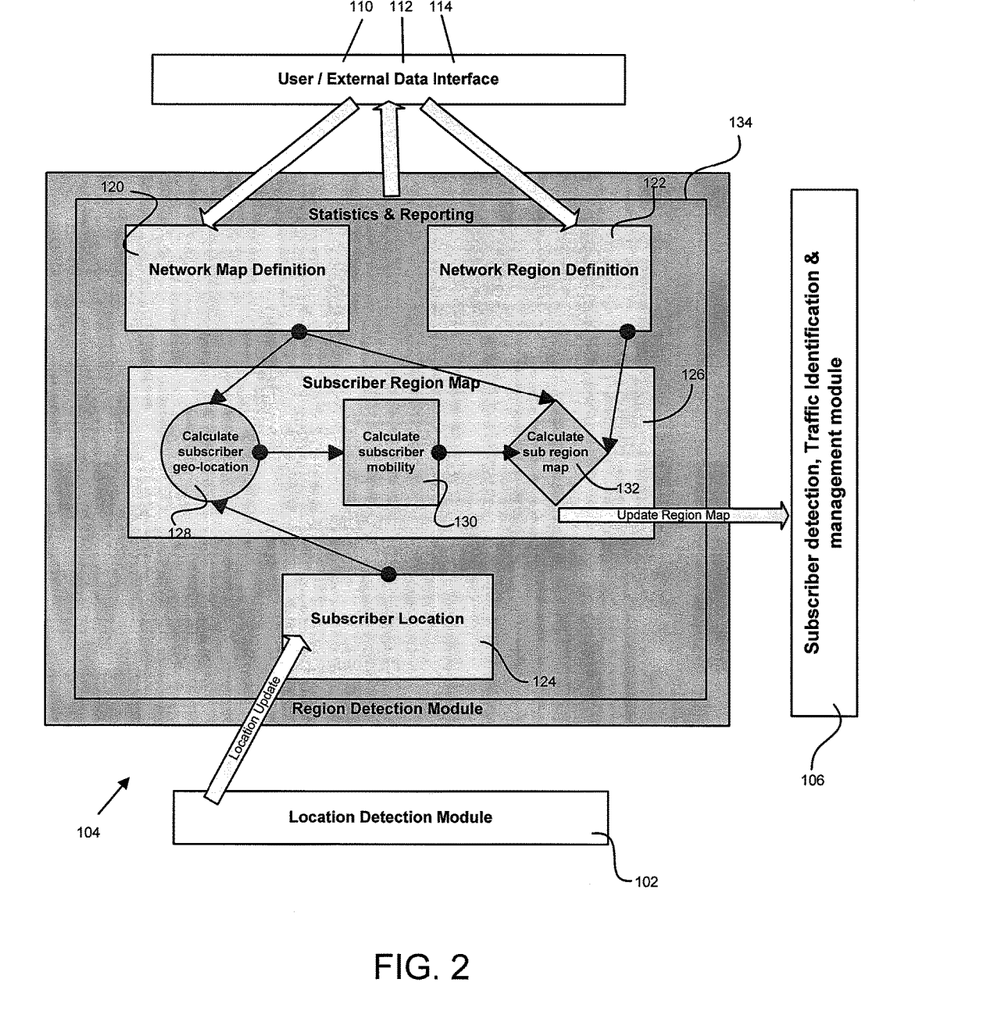
FIG. 2 illustrates a region detection module of a system for geo-location related services.

FIG. 2 illustrates the region detection module 104 for detecting if the subscriber is within an operator defined region. The region detection module 104 receives data from the location detection module 102 and may further receive other external data from, for example, one or a plurality of external databases 110, user interfaces 114 or other external components. The region detection module 104 may contain a processor (not shown) used by the various components or each component may include its own processor. In another alternative, the region detection module 104 may access an external processor used by the system 100.

The region detection module 104 includes a network map definition component 120, which correlates the topology of each cell in the network to its representation on a geographic map of the region. Cellular topology could be described by several attributes and based on the accuracy of the attributes; the cell may be represented as an appropriate geometric shape on the geographic map. For example, the cell may be represented by a dot, a circle, a sector of a circle, an ellipsoid or the like. The network map definition component 120 receives information with respect to the antenna coordinates of an operator's region. The antenna coordinates may be the geographic coordinates (latitude, longitude) of the base station antenna or other geographical indicator that will allow the cell to be represented on the map. The network map definition component 120 may also receive information such as the cell radius, the radius around the antenna in which the cell provides coverage, and or further antenna information such as antenna azimuth, elevation, zenith, radiation pattern. For directional antennae, the further parameters may represent the range of the cell or antenna as a sector of a circle or an ellipse.

Cellular topology attributes could be obtained from sources such as the network operator provided data for Cell Identification (Id) and the operator's topology attributes, public databases (such as http://opencellid.org/) that map worldwide Cell Ids to geographic coordinates or the like. Identification attributes for the cells in the network may also be detected and reported by the location detection module 102.

The network map definition component 120 creates a table that can be referenced by the identifier of the cell and for each cell stores cellular topology attributes as described above. The network map definition component 120 may include a storage component or may be operatively connected to an external storage component which stores the table. The table may also stores the attributes that describe the applicable geometric representation for the cell.

Figure 3:
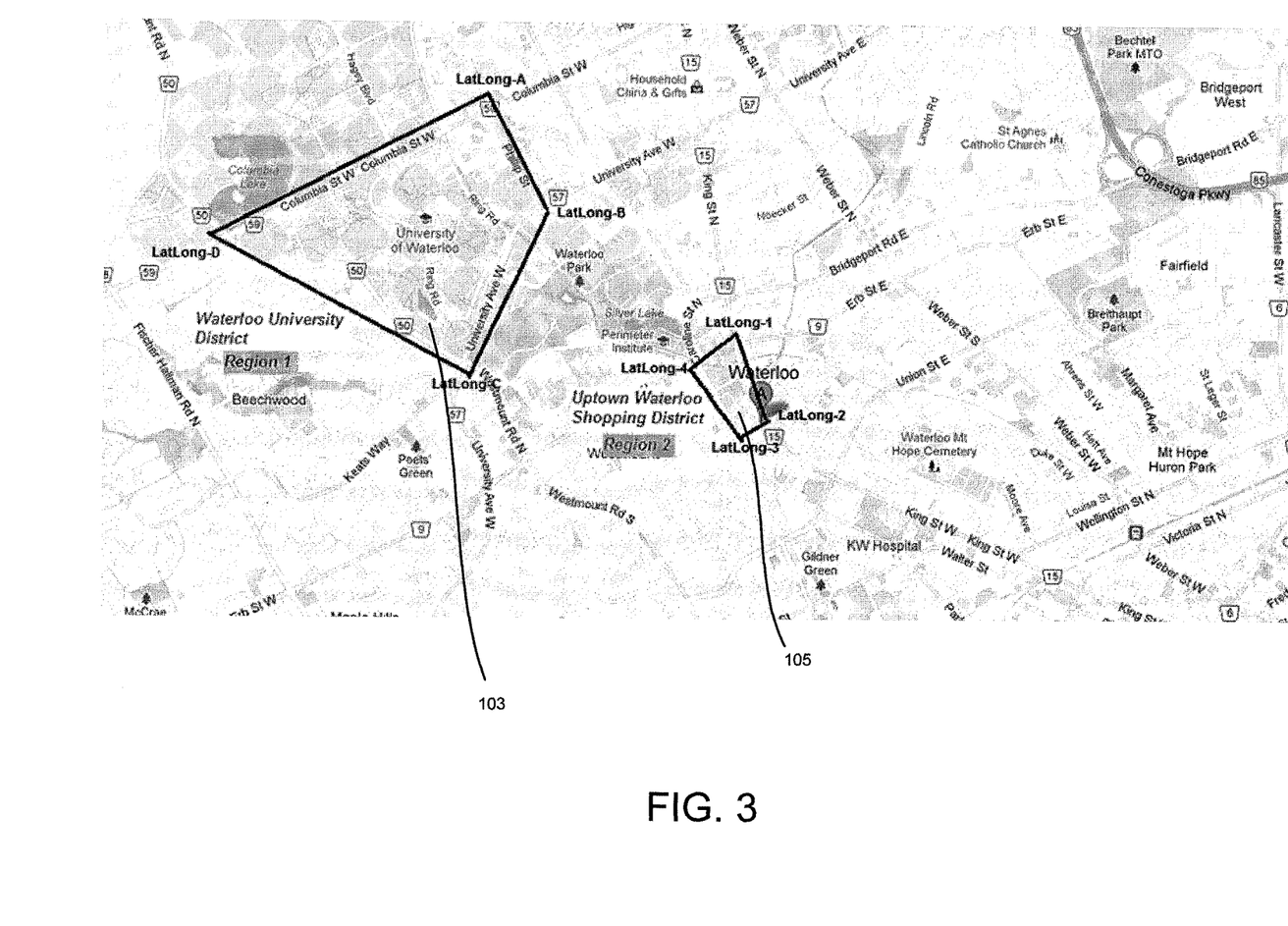
FIG. 3 is an example map showing defined regions.

The region detection module 104 further includes a network region definition component 122. The network region definition component 122 interfaces with the system user interface 114 and enables the network operator to define the network region(s). One example of a map illustrating network regions is shown in FIG. 3. The map shows a subset of where in the operator's network can be defined and two specific regions 103 and 105 are defined. Each region within the operator's network can be defined as chosen by the operator. For example, the network operator may select to define various regions as a set of polygons. Each polygon is identified by the geographic coordinates (latitude, longitude) and/or other vector data that allow it to be represented on a geographic map. There could be a plurality of defined regions within an operator's network. The regions may overlap or may all be adjacent to one another.

By allowing the operator to define the regions, the operator would have flexibility in choosing what network services apply, for example, what policy to apply and what regions to define. For each subscriber a region map is calculated. If the subscriber is located in an area that falls under more than one overlapping region, all such regions could be included in the subscribers region map. The operator could then apply logical operators between these regions to decide an applicable policy or policies. For example, the operator may have a policy of offering free access to social networking sites in a university region and a policy of sending discount coupons by SMS for a shopping district. These two regions could overlap and if a subscriber was present in the overlapping area, he could have both policies applied to him. In an alternative example, the operator could create a new policy that was only applicable if the subscriber were present in the overlapping region, for example, the subscriber could be considered a "student shopper" and the operator may give the subscriber free access to an online shopping portal that was offering special deals on items targeted at students.

Another example of applying network service related to geo-location would be the operator demarcating an interstate highway as a region. The operator could also demarcate towns that fell along the interstate highway as regions in themselves. It is possible that these regions would overlap where the highway passed through a town. A subscriber travelling on the highway would have policies applied that were targeted at travelers. A second subscriber in one of the towns could have policies applied that were meaningful for residents of that town. If a subscriber was present in an overlap region, he could be considered a "traveler passing through" this town. There could be policies targeted specifically at this set of subscribers, for example, sending notifications about nearby hotels or providing tourist related information.

Returning to FIG. 2, the subscriber location is provided by the location detection module 102 to the region detection module 104. The region detection module 104 includes a subscriber location component 124, which maps each subscriber's location on the map based on geographic coordinate (latitude, longitude) of the current cell and the radius is the distance of the subscriber from the base station antenna. The subscriber may be mapped as a dot or as a circle or other identifying mark. In a specific example, the size of the subscriber's marker may be relative to the accuracy of the data providing the subscriber's location.

The region detection module 104 further includes a subscriber region map component 126. The subscriber region map component 126 is used to identify the set of network regions in which that a subscriber is present. In one example, the following method may be used to determine the location and region map for each subscriber:

Define the geometric representation of all network regions on a geographic map;

Define the geometric representation of the cell on the map;

Define the geometric representation of a subscriber on the map;

Identify the overlap area between the subscriber and the cell, which represents the geographic area in which the subscriber is present 128;

Identify all network regions with which the subscriber presence overlaps and identify the percentage of overlap between the subscriber presence and network region, therefore calculating the subscriber's mobility 130;

If the percentage of overlap is greater than or equal to some predetermined value (for example, 50%), add the network region to the region map for the subscriber 132;

Report the region map for the subscriber to the subscriber detection and traffic management module 106; and Each time the location detection module 102 reports a location for a subscriber that is different from the previously reported location, the region map is recalculated for the subscriber and reported to the subscriber detection and traffic management module 106.

A reporting component 134 may also be included in the region detection module 104 and may be operatively connect or may incorporate the other components of the regions detection module 104. The reporting component 134 is used to report statistics about subscriber presence in a network region to a central and/or an external database 110, or central or external reporting modules 112. Some examples of what these reports could contain are, for example:

Count of active subscribers per network region;
Count of unique subscribers per network region;
Time spent by a user in a network region;
Mobility patterns for subscribers or groups of subscribers; and
Time of day patterns for subscriber presence in different network regions.

Figure 4:
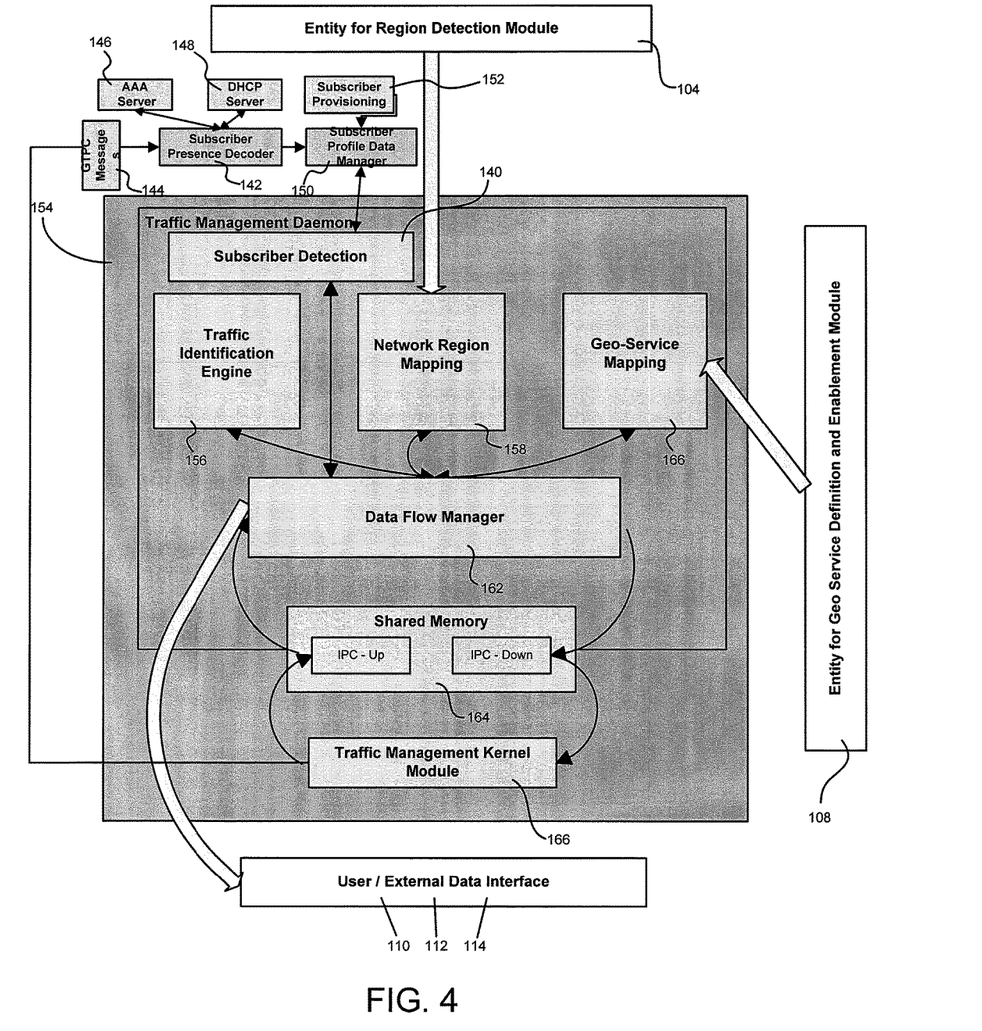
FIG. 4 is a subscriber detection and traffic management module of a system for geo-location related services.

FIG. 4 illustrates components and data flow of the subscriber detection and traffic management module 106. The subscriber detection and traffic management module 106 may detect subscribers as they login and logout of the operator's network. The subscriber detection and traffic management module 106 may also be monitoring the traffic flows for each subscriber and identifying what applications are being used per subscriber flow and identifying which traffic flows are impacted for a particular geo-service, a service that, for example, supports the access to geographical data, offers search strategies within the network, facilitates the presentation of geographical data or the like. Further, the subscriber detection and traffic management module 106 is also adapted to apply the corresponding geo-service actions on the impacted traffic flows.

The subscriber detection and traffic management module 106 contains a subscriber detection component 140. The subscriber detection component 140 maps session IP addresses to subscribers present in the network. Subscriber presence on the packet core is identified by the subscriber presence decoder 142 using, for example, one of the following mechanisms:

Monitor and decode the messages 144 on the GPRS Tunneling Protocol Control (GTPc) link between the SGSN and GGSN:
  i. The GTPc messages 144 for session creation and deletion contain details about a subscriber's International Mobile Subscriber Identity (IMSI) and allocated IP address; and
  ii. Each IMSI maps to a unique subscriber and session creation/deletion messages can be used to detect subscriber login/logouts from the network; or Interface with an external Authentication, Authorization, and Accounting (AAA) server 146 or Dynamic Host Configuration Protocol (DHCP) server 148 to get notifications of subscriber session creation and deletion.

A subscriber profile data manager 150 is provisioned by the network operator with subscriber provisioning information 152, such as service tiers and types of active services. Based on the above decoded and provisioned information; the subscriber detection component 140 is able to map a session IP address to a subscriber and to the session's related service information.

The subscriber detection and traffic management module 106 includes a traffic management daemon 154 or component. The traffic management daemon 154 contains subcomponents such as a traffic identification engine 156, a network region mapping component 158, a geo-service mapping component 160, and a data flow manager 162. The traffic management daemon 154 may further interface with a shared memory or storage component 164 which may be used to exchange data with the traffic management kernel module 166. The traffic management daemon 154 interprets the packets on the data plane similarly to how an end-point in the network would interpret the packets for the given flow.

The traffic identification engine 156 inspects some of the packets in a flow to determine the protocol or application that is being carried in the data flow. Protocol recognition may be done based on the first few packets of a flow. The protocol may be determined by various techniques for example, signature matching, recognizing one flow and extracting information from the one flow about subsequent flows, behavioral analysis of multiple connections, analyzing repetitive nature of packets and their timing information, and the like.

The network region mapping component 158 is adapted to keep track of the network regions in which the flow is active. The geo-service mapping component 160 then correlates the application and location data for the flow to the set of logical conditions as determined by the defined service. Based on this correlation, the geo-service mapping component 160 is able to identify which flows are impacted and in what way. The geo-service mapping component 160 then identifies the appropriate action, such as the appropriate policy for the data flows as required by the geo-service. Input for the traffic identification engine 156, the network region mapping 158 and the geo-service mapping component 160 may be stored by and provided from the data flow manager 162, which may retrieve information from the shared memory component 164. The data flow manager 162 maintains a correlation between a flow, the type of protocol or application being accessed in the flow, the network regions the flow is active in, which geo-service definitions are applicable to the flow and what are the associated actions for the flow.

The logical conditions that define the service for a specific region may be set by the operator or predetermined by the system. Using the example of a traveler on an instate highway passing through a town, an example set of logical conditions could be as follows:

(If SubRegion is "TownA") AND (If SubRegion is "Highway") AND (If TimeOfTheDay is between 6:00 AM and 9:00 AM) Then (Action Send Information about nearby restaurants serving breakfast in "TownA")

(If SubRegion is "TownA") AND (If SubRegion is "Highway") AND (If TimeOfTheDay is greater than 8:00 PM) AND (If TimeSpentInRegion "Highway" is greater than 6 hours) Then (Action Send Information about nearby hotels and motels in "TownA");

(If SubRegion is "Highway") Then ((Action Count Bytes Downloaded/Uploaded) and (Action Bill counted bytes at special "Highway Rates"); and/or (If SubRegion is "TownA") AND (If SubDataFlow is the "TownInformationPortal") Then ((Action Count Bytes Downloaded/Uploaded) and (ActionBill counted bytes at zero charges))

In another example, the network operator may want to restrict low value traffic such as peer-to-peer downloads on a highway and prioritize the typically limited radio resources for more critical usage such as VoIP traffic. In this example, the logical condition below may be set.

(If SubRegion is "Highway") AND (If SubTrafficProtcol is "P2P") Then (Action ShapeTrafficTo 128 kbps)

The data flow manager 162 correlates the information for the data flow, such as the flow's associated subscriber details, the application/protocol being accessed, the network regions this flow is active in, the geo-service definitions that are applicable for this flow and what action(s) are required to be taken.

The implementation of the desired action may be done by the traffic management kernel module 166 where the action has been communicated by the data flow manager 162 within the traffic management daemon 154, sometimes referred to as a user space daemon, which is used for identifying the traffic (application or protocol) carried by that data flow. The traffic management kernel module 166 selects packets at appropriate times (start, middle, end) from each data flow and passes the packets to the traffic management daemon 154 using an Inter-process Communication (IPC) mechanism. The packets are picked up in the traffic management daemon 154 and passed on to the traffic identification engine 156 where application and protocol recognition is done using techniques such as recognizing protocol signatures, regular expression matching, extracting information to predict flow characteristics, analyzing periodicity, repetition of packets and the like. Once the application or protocols have been identified, new flows can be monitored and tracked for similar characteristics. Triggers can be raised when the desired protocol and application parameters are seen on the new flows and follow-up action can be taken by the geo-service and the associated policies.

The traffic management daemon 154 also receives a region map per subscriber from the region detection module 104. The traffic management daemon 154 may receive an updated region map from the region detection module 104 when for example, the map changes for a subscriber. In an alternative, the traffic management daemon 154 may receive an updated map at pre-determined intervals, for example once a day, once an hour, once a week, etc.

The data flow manager 162 maintains a per subscriber map of the subscriber's flows, the application and/or protocol active per flow and the network regions within which the flows are active. The data flow manager 162 may also keep a count of transmitted and received packets per flow and per region within which the flow is active.

The geo-service mapping component 160 may also check per subscriber flow if any of the logical conditions provided by the geo-service definition and enablement module 108 are met and if so what actions are applicable to this flow. The geo-service conditions and actions may be retrieved from the geo-service definition and enablement module 108. The geo-service mapping component 160 may complete this check periodically, for example, every second, every minute etc. during the lifetime of the flow and the check may also be done each time there is a change in the set of regions the flow is active in, for example, when the subscriber changes location and thus enter a new or different region. The geo-services mapping component may further complete a check on the change of the subscriber's traffic flow to apply different geo-service definitions if the traffic flow has changed.

The traffic management daemon 154 returns the packets to the traffic management kernel module 166. The traffic management daemon 154 may also provide the traffic management kernel module 166 with the set of actions (new or changed) that may be taken on the packet flow in question. Some of the actions possible on the flow are counting packets, diverting to another server, copying, teeing, queuing packets, dropping packets, resetting the session or notifying an external entity and the like. The traffic management kernel module 166 applies the associated action on the packet and which is intended to enforce the conditions defined by the geo-service.

The subscriber detection and traffic management module 106 may also incorporate a reporting function and be used to report statistics about the defined geo-service and subscriber usage per network region to a central database. Some examples of reports are as follows:

Volume of data used by a subscriber per network region the subscriber was active in;

Type of traffic (applications/protocols) used by a subscriber in different network regions;

Traffic mix (applications/protocols) per network region and how this changes depending on the time of the day;

Volumes of data consumed in the different network regions during the day;

Categories of subscriber tiers (gold, silver, bronze) active per network region and how much data they have consumed;

Usage patterns of subscribers per network region—which are the heavy users and which are not;

Subscribers that have been impacted by the defined geo-service and in which network region; and/or Active geo-services per network region and what traffic is impacted by them.

Figure 5:
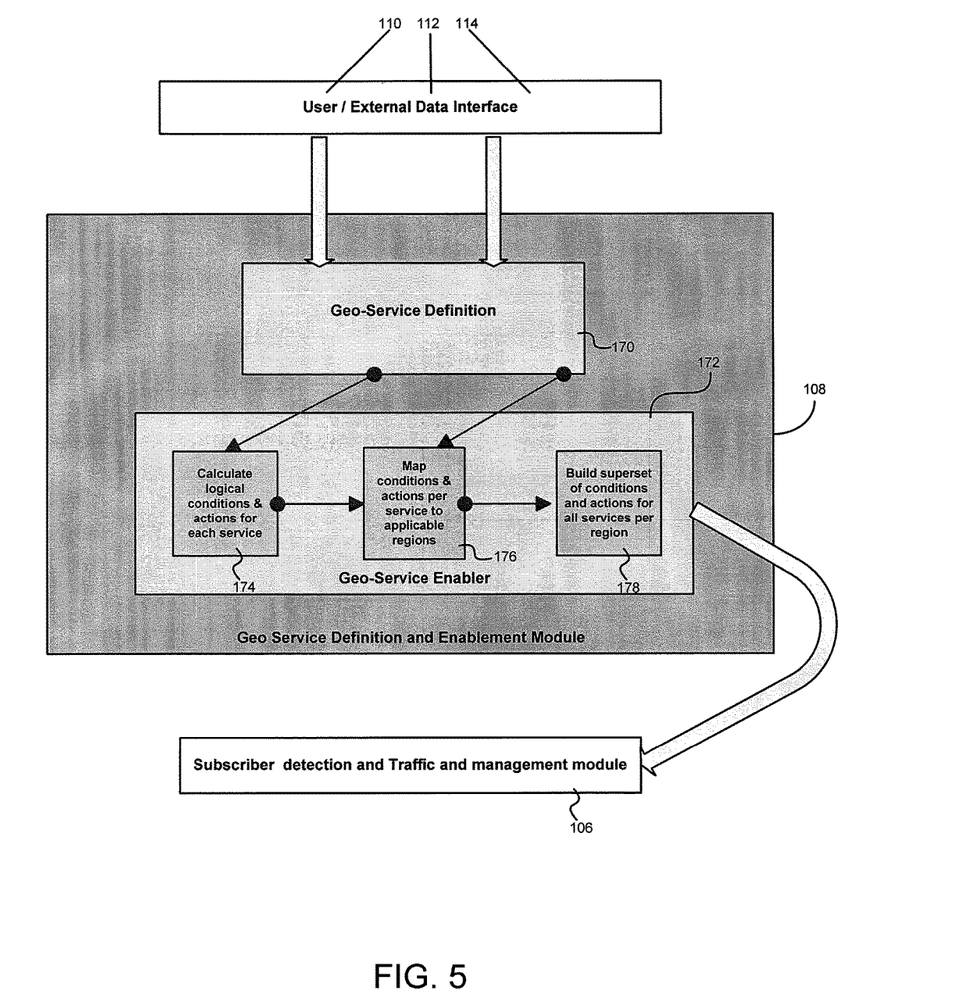
FIG. 5 is a geo-service definition and enablement module of a system for geo-location related services.

FIG. 5 illustrates components of the geo-service definition and enablement module 108. The geo-service definition and enablement module 108 interfaces with a user and/or external interface 114 to define the scope and functionality of the specific geo-services and to identify the logical conditions that would enable the desired behavior.

The geo-service definition and enablement module 108 includes a geo-service definition component 170 that interfaces with the user interface 114 and may further collects input from the network operator definitions of specific geo-services. These parameters may define policies for the end use case the network operator wants to target, such as implementing geo-fences for value traffic in high traffic city centers, prioritizing real time applications, etc.

The geo-service definition and enablement module 108 further includes a geo-service enabler 172 that calculates the logical conditions that would enable the geo-service(s) for the multiple network regions 174. The geo-service enabler 172 breaks down a service into a set of logical conditions per network region as applicable to a data flow and the expected action to be taken if any condition is met. This break down may be done for each active geo-service. The geo-service enabler 172 may further map active services to the network regions for which the active serves are applicable 176. Then, per network region, the geo-service enabler 178 builds a superset of all applicable conditions and expected actions that would enable all active services for that region.

The geo-service definition and enablement module 108 sends to the entire set of these logical conditions and actions, along with information about the network region and services to which the conditions, actions and information map, to the subscriber detection and traffic management module 106. Within the subscriber detection and traffic management module 106, each data flow is checked against these conditions stored therein and if there is a match, the applicable action is taken. When there is a change in any defined service, the geo-service enabler 172 may recalculate the set of logical conditions and sends an update to the subscriber detection and traffic management module 106.

Figure 6:
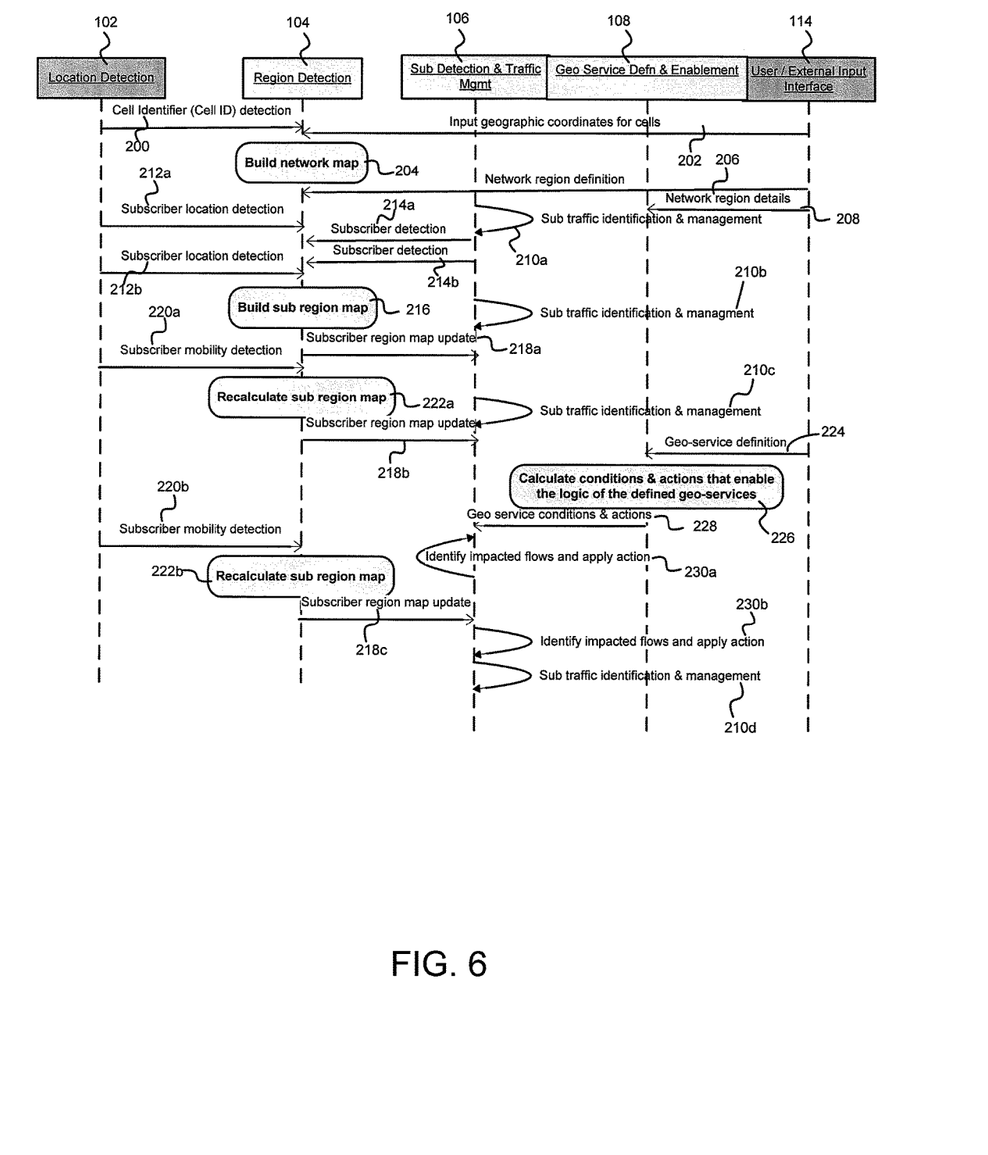
FIG. 6 is a sequence chart illustrating message exchanges of a system for geo-location related services.

FIG. 6 illustrates a sequence chart of an example of possible message exchanges between the various components of the system 100. The location detection module 102 sends the cell identifier detection 200 to the region detection module 104. The region detection module 104 also receives input from the network operator with respect to the geographic coordinates for the cells 202. The region detection module 104 then builds a network map 204.

The region detection module 104 receives further network region definitions 206 from the network operator through the user interface 114. The network operator may also provide network region details 208 to the geo-service definition and enablement module 108.

The subscriber detection and traffic management module 106 continues to monitor the subscriber traffic 210a and identifies possible packet flows that may fall within the conditions associated with various geo-services. The subscriber detection and traffic management module 106 may continuously monitor the subscriber traffic 210 or may monitor the traffic 210 at predetermined intervals, for example, the beginning, middle and end of each flow, only the beginning of the packet flow, at the beginning of a session, etc.

Further, the system 100 identifies, in real-time, presence of a subscriber within one or more dynamically defined regions within a wireless network. The region detection may receive period subscriber location detection information 212 from the location detection module 102 and further subscriber detection data 214 from the subscriber detection and traffic management module 106. With the subscriber and network region data, the region detection module 104 may then produce and store a subscriber region map 216. The subscriber region map may be transmitted 218 to the subscriber detection and traffic management module 106 on creation and on each update to the map, which is intended to aid in correlating, in real-time, the applications and/or types of traffic flows being used by a subscriber to the region(s) in which this data is being used.

The region detection module 104 may periodically receive updates from the location detection module 102 with respect to the subscriber mobility detection 220. On receipt of this data, the region detection module 104 may recalculate the subscriber region map 222. After each iteration, the map may be sent 218 to the subscriber detection and traffic management module 106. The subscriber detection and traffic management module 106 continues to identify and manage subscriber traffic 210.

Geo-service definitions are received 224 by the geo-service definition and enablement module 108 through input from the network operate through a user interface 114 or other external input, such as an external database 110. With the geo-service definitions, the geo-service definition and enablement module 108 calculates conditions and actions that enable the logic of the defined geo-services 226. The geo-services conditions and actions are then transmitted to the subscriber detection and traffic management module 106. The subscriber detection and traffic management module 106 then reviews and identifies impacted flows and applies the actions to the impacted flows 230. The subscriber detection and traffic management module 106 may review flows after each updated to the subscriber region map and identify impacted flows and apply action with respect to each iteration of the subscriber region map. Geo-service actions may also be updated when a change to the traffic flow has been detected, which may correlated to new or different geo-service definitions being applied to the traffic flow.

The method is intended to provide real-time usage control at the application level within any boundary demarcated by geographic coordinates. The packets per subscriber flow are measured based on location and the regions and locations within the operator's network can be specified as any set of geographic coordinates.

Figure 7:
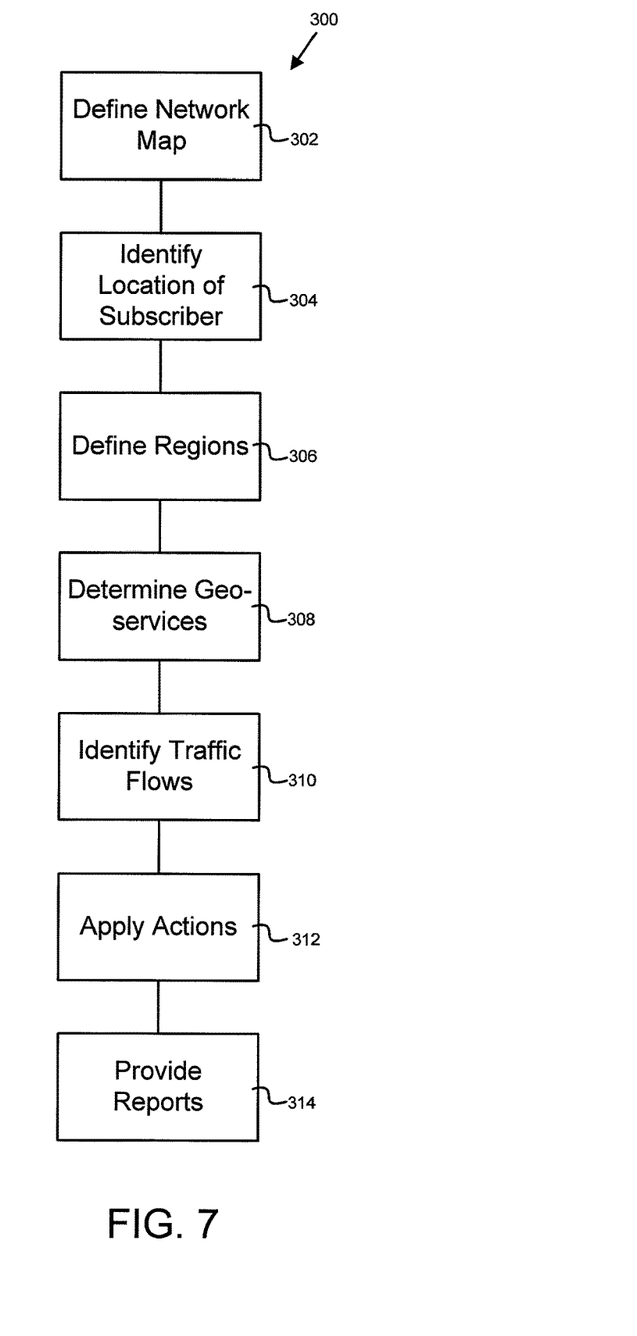
FIG. 7 illustrates an example method of implementing geo-location related services on a network.

FIG. 7 is a flow chart of an example method for providing geographic location related network services 300. The network map is defined 302 through input from the location detection module, from the network operator through a user interface and/or from external input such as databases containing antenna information. The location detection module 102 of the system 100 identifies the location of the subscriber 304. These actions may occur simultaneously or the subscriber location may be identified prior to the network map being fully defined.

The map is then updated with defined regions 306. The regions may be defined by the network operator or through pre-existing policies stored in databases. The various regions of the map may overlap and may represent various actions and policies associated per subscriber and/or per traffic flow for the region. The regions may be updated by the network operator or through other input at any time. Geo-service definitions are also defined 308 by the network operator or other predetermined policies. The geo-service definitions may be updated periodically by the network operator.

The system further identifies subscriber traffic flows 310. Traffic flows may be monitored continuously and the system may be identifying and managing a plurality of traffic flows at any given time. The traffic flows that are impacted by the geo-service definitions based on the subscriber region map may be identified and appropriate action 312 may be applied to these flows. It will be understood that the traffic flows may be continuously or periodically monitored to ensure the correct geo-definition is still being applied based on any updates with respect to the subscriber location and subscriber activity.

The system 100 further is intended to provide for location based reporting of subscriber statistics where the location can be specified as any set of geographic coordinates within the operator's network. The system 100 may further provide various reports 314 to the network operator through the various modules within the system or though the interaction with a centralized report module 112.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for applying network services related to geographic location of a subscriber comprising:
   receiving regions within a map, from a region detection module;
   receiving geo-service definitions for the regions, from a geo-service definition and enablement module, wherein the geo-service definitions comprise geo-service actions based on pre-determined logical conditions for the regions and subscriber traffic flows, wherein the geo-service actions are configured to impact a subscriber's traffic flow, via applying a geo-fencing policy to the subscriber's traffic flow, wherein the geo-fencing policy comprises a policy to amend the traffic flow related to at least one application;
   determining information related to the subscriber's traffic flow by a subscriber detection and traffic management module, wherein the information related to the subscriber's traffic flow comprises the at least one application being accessed by the subscriber and protocol being accessed by the subscriber;
   determining the subscriber's location based on data extracted from packets of the subscriber's traffic flow by a location detection module;
   determining a subscriber's region based on the subscriber's location;
   and applying the geo-service definitions to modify the traffic flow related to the at least one application, based on the subscriber's region and based on the information related to the subscriber's traffic flow, wherein the applying the geo-service definitions further comprises;
   determining if the subscriber's traffic flow changes to another at least one application being accessed by the subscriber and protocol being accessed by the subscriber;
   and re-applying geo-service definitions based on the subscriber's region and the information related to the changed subscriber's traffic flow.

2. A method according to claim 1 further comprising defining geo-service definitions per traffic flow.

3. A method according to claim 1 further comprising generating reports of the applied geo-service definitions per subscriber to a network operator.

4. A method according to claim 3 further comprising updating the regions within the map based on the generated reports.

5. A method according to claim 3 further comprising modifying the geo-service definitions based on the generated reports.

6. A method according to claim 1 further comprising: determining if the subscriber has changed region; and re-applying geo-service definitions based on the subscriber's changed region and the information related to the traffic flow.

7. A method according to claim 1 wherein a plurality of geo-service definitions may be applied if the subscriber's region is determined to be within a plurality of regions within a map.

8. A method according to claim 1, wherein re-applying geo-service definitions comprises applying further policies to directly impact the subscriber's traffic flow without a change in the subscriber's region.

9. A method according to claim 1, wherein reapplying the geo-service definitions comprises restricting the subscriber's access to the at least one application.

10. A method according to claim 1, wherein re-applying the gen-service definitions comprises prioritizing the subscriber's access to the at least one application.

* * * * *